United States Patent
Couix

[11] 3,875,953
[45] Apr. 8, 1975

[54] AUTOMATIC COLLAPSIBLE CAMPER TENT

[76] Inventor: Albert Couix, 4 rue Labatie, Tournon, France 07300

[22] Filed: Oct. 24, 1973

[21] Appl. No.: 409,284

[30] Foreign Application Priority Data
June 1, 1973 France .................. 73.20650

[52] U.S. Cl. .................. 135/4 A; 135/1 A
[51] Int. Cl. .................. A45f 1/00; B60p 3/34
[58] Field of Search ........ 135/1 A, 4 R, 4 A, 7.1 A; 296/23 R, 23 A, 23 E, 23 F

[56] References Cited
UNITED STATES PATENTS
| | | | |
|---|---|---|---|
| 2,481,230 | 9/1949 | MacDonald | 135/4 A X |
| 3,489,452 | 1/1970 | Plante | 135/1 A X |
| 3,753,590 | 8/1973 | Couix | 296/23 R |

FOREIGN PATENTS OR APPLICATIONS
| | | | |
|---|---|---|---|
| 1,194,597 | 11/1959 | France | 296/23 A |
| 1,936,295 | 2/1970 | Germany | 296/23 F |

Primary Examiner—Paul R. Gilliam
Assistant Examiner—David H. Corbin
Attorney, Agent, or Firm—Bacon & Thomas

[57] ABSTRACT

A collapsible camper tent which comprises a frame equipped with wheels and a harness to be connected therewith to a tractor vehicle and a body containing a canvas supported by a framework consisting of several U-shaped ribs which are articulated to the body. The canvas is adapted to the stretched under the opening action of two lids connected by one of their sides to the body. The lids are pivoted in the transverse direction of the camper tent. Two of the ribs of the framework which stretches the canvas are connected to the body by means of an articulated linkage or deformable parallelogram system which consists of lever arms. A first of the lever arms is connected, by an articulation, to one of the pivoting lids of the body in such a way that the opening and the closing of the lid permits the obtaining of a controlled ascending or descending trajectory curve of the pivot point of the two ribs to the linkage system, thus increasing the length of the ribs when they are erected and shortening their length when they are collapsed for permitting their insertion under said lid in the direction of the width of the body.

5 Claims, 11 Drawing Figures

AUTOMATIC COLLAPSIBLE CAMPER TENT

The present invention relates to collapsible camper tents or folding caravans of the type comprising a frame equiped with wheels and a harness, a body closed by one or two lids and containing a folding canvas adapted to be automatically stretched over the body in response to the opening of the lids and conversly, automatically folded in response to the closing of the lids.

The U.S. Pat. application Ser. No. 330,738, in the name of the same inventor Albert Couix filed on Feb. 18, 1973 describes a folding caravan or collapsible camper tent of the same type, in which one of the ribs or arch-members of the framework supporting the canvas, is connected to the body by means of a system of links and articulated arms permitting the lenghtening of the rib when it is erected in order to automatically stretch the canvas, or the shortening of the rib when it is folded in order that it may be inserted and stored under the lid.

In the camper tent described in the above-mentioned Canadian application, the framework supporting the canvas is erected in the longitudinal direction of the body.

It had become apparent that, in order to realize an automatic collapsible camper tent with a framework supporting a canvas and adapted to be erected or folded in the transverse direction of the body, it is convenient to further shorten the length of the ribs in order that they may fit in their folded position under the lids, in the direction of the width of the camper tent.

The object of the present invention is to provide such an advantageous camper tent, in which two of the ribs which provide the stretching of the canvas are pivotably supported by the body by means of an articulated linkage system, one of the links of which is connected by means of a connection to one of the pivoting lids on the longitudinal sides of the body, in such a way that the opening and the closing of the lids permit the obtaining of a controlled ascending or descending trajectory curve of the pivot point of the two ribs to the linkage system.

According to a first embodiment, the parallelogram system comprises three lever arms. The free ends of two of the ribs of the framework supporting the canvas are pivoted to one of the ends of the second lever arm, the other end of which is pivoted to one of the ends of the third lever arm. The other end of the third lever arm is pivoted to a fixed point of the body.

The second lever arm is itself connected to the pivoting lid by means of the first lever arm which is pivoted at one of its ends to the second lever arm and at its other end to a gusset which pivots the first lever arm to the body.

Other objects and a fuller understanding of the invention may be had by referring to the following description and claims, taken in conjonction with the accompanying drawings in which:

Figure 1:
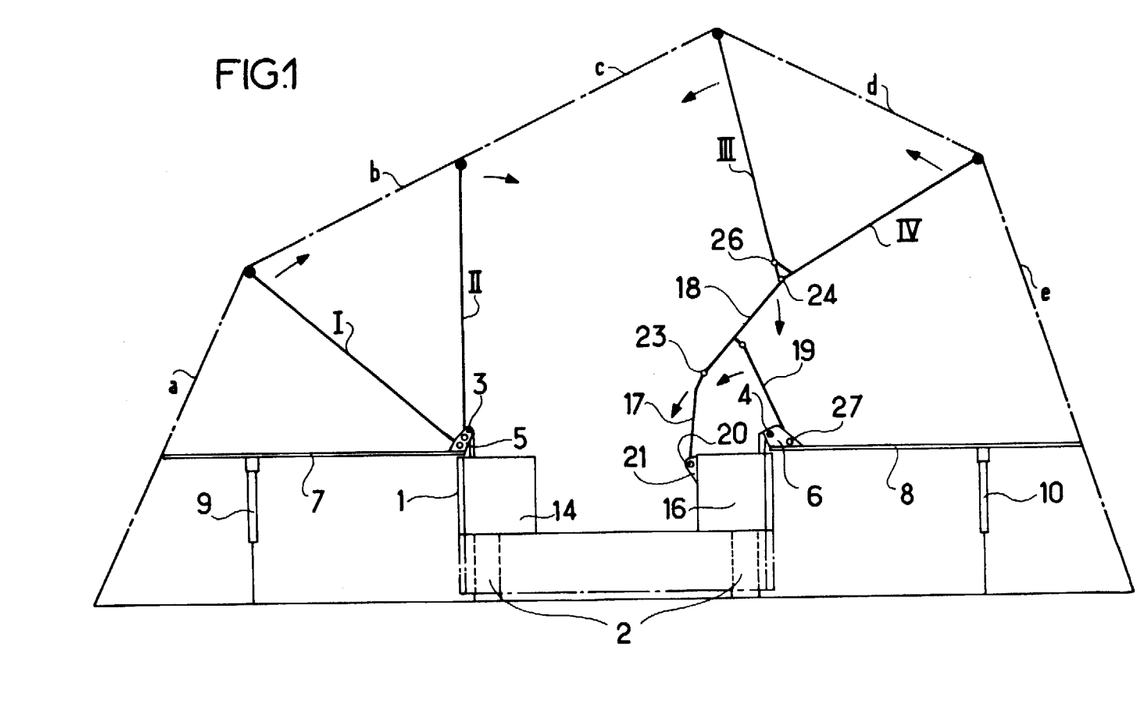
FIG. 1 is a schematic view of the collapsible camper tent the framework of which is erected in the transverse direction of the body according to the invention.
Figure 2:
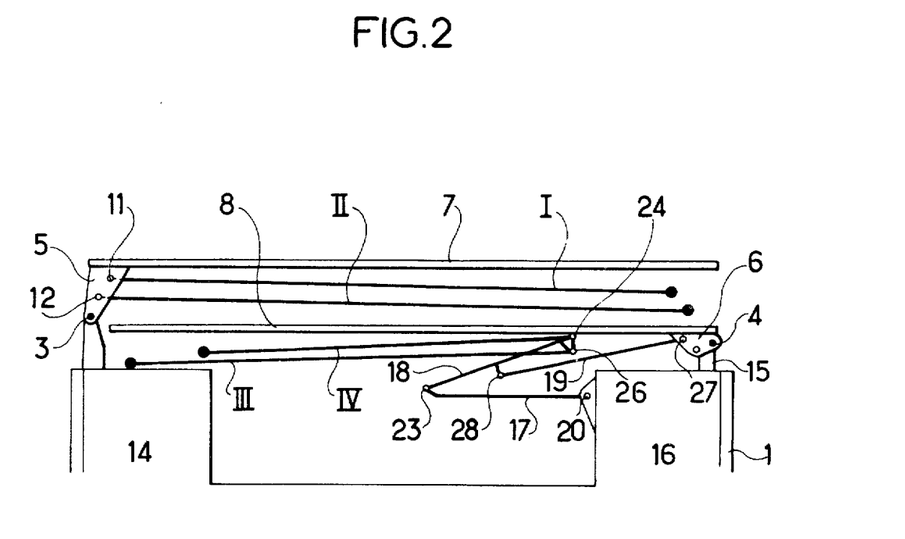
FIG. 2 shows details of the framework in its collapsed or folded position.
Figure 3:
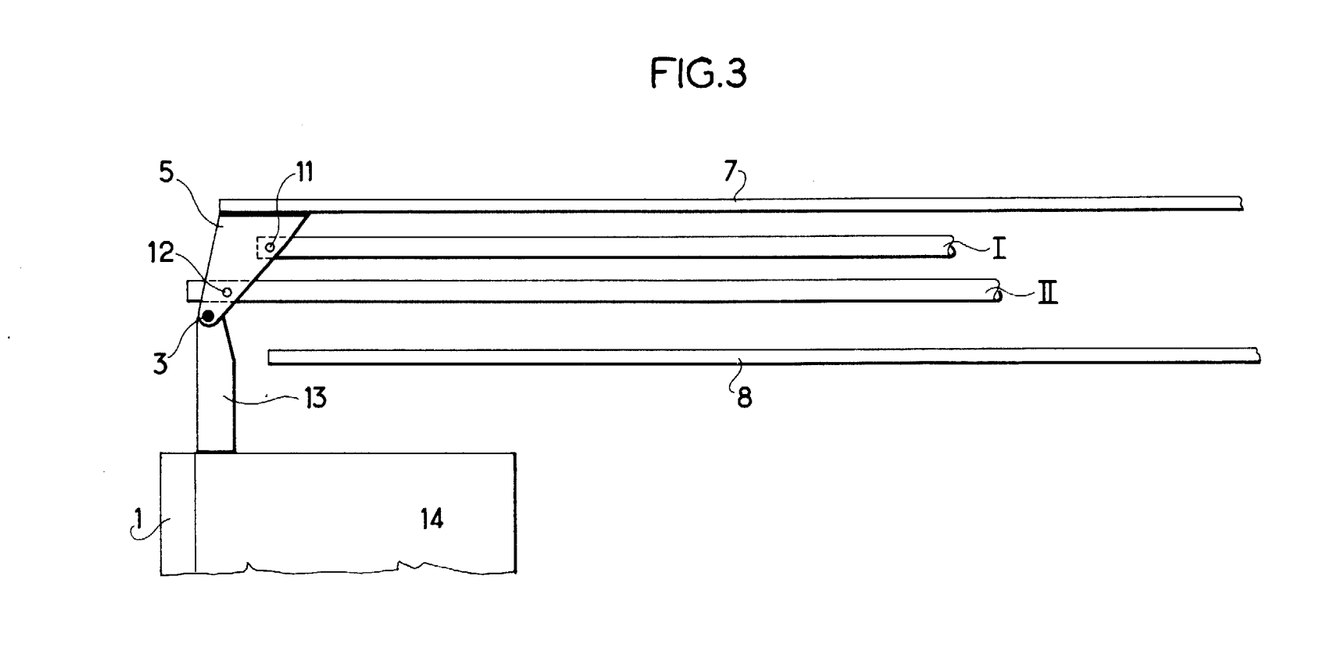
FIG. 3 shows, in an enlarged view, the detail of the left lid in its closed position.

Referring now to the figures, the folding caravans or collapsible camper tent as shown in FIG. 1, mainly comprises a body 1 fixed on a frame equipped with a harness and two wheels 2. To body 1, and at its two longitudinal sides, there are articulated, around pivots 3 and 4 provided on gussets or yokes 5 and 6, lids 7 and 8 which open transversely to body 1. Lids 7 and 8 are supported, in their opened position, by means of telescopic legs 9 and 10. In their closed position, as shown in FIG. 2, lid 7 covers lid 8.

The articulated framework supporting the canvas of the camper tent comprises four ribs designated by the reference numeral I, II, III and IV. Each rib has a U shaped form.

Referring to FIGS. 1 to 5, it is seen that, at one side of body 1, and particularly to the gussets 5 of lid 7, are articulated, by means of pivots 11 and 12, respectively, the ends of lateral uprights of the ribs I and II. The gussets 5 of lid 7 are pivotally connected, by means of pivots 3, to gussets 13 fixedly connected to the bench or seat 14 of body 1. The ribs I and II are connected together by sections a and b of the canvas of the camper tent.

Referring to FIGS. 1 and 6 to 11, it is seen that at the other side of the body 1, the gussets or yokes 6 of lid 8 are articulated, by means of pivots 4, to gussets 15 fixedly connected to the bench or seat 16 of the body 1.

The ends of the lateral uprights of the ribs III and IV are connected, at each side, to lid 8 and to bench or seat 16 of the body 1, by means of a deformable parallelogram system comprising three lever arms 17, 18 and 19.

Lever arm 17 is pivotally connected, at one of its ends, to a pivot 20 of a gusset 21 fixed to the bench 16. At its other end, the lever arm 17 comprises a fixedly connected gusset 22. To gusset 22 is articulated, by means of a pivot 23, one of the ends of lever 18. The other end of lever 18 is articulated, by means of a pivot 24, to a gusset 25 integrally connected to the end of rib IV. One end of rib III is articulated to gusset 25 by means of a pivot 26.

Figure 10:
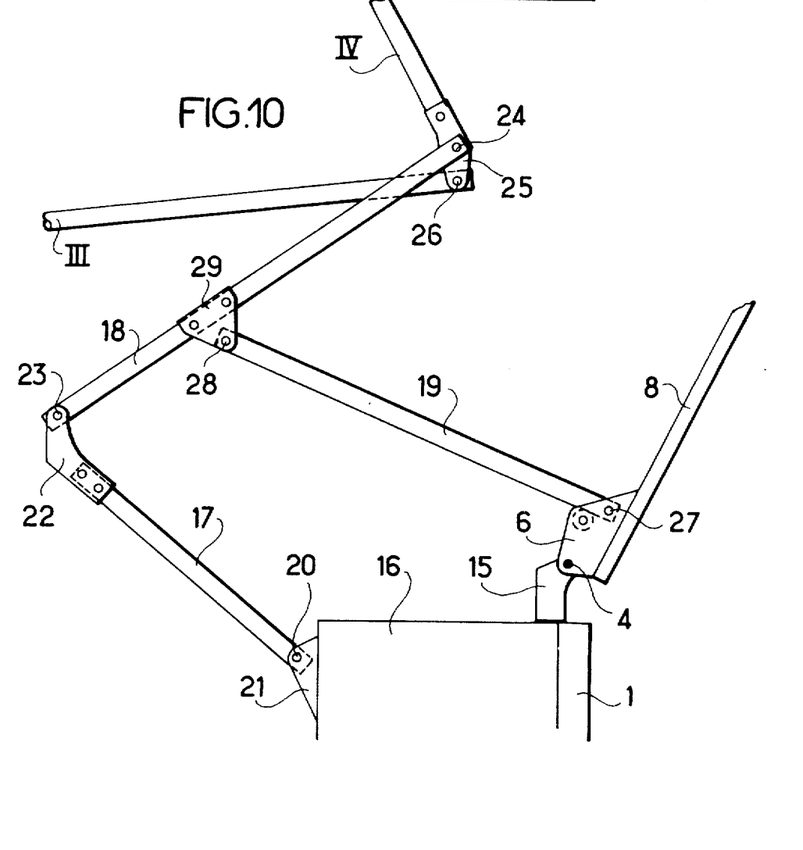
FIG. 10 shows, in an enlarged view, the detail of the articulation device shown in FIG. 9.

Lever 18 is connected to lid 8 by means of lever 19. To this effect, one of the ends of the lever 19 is articulated, by means of a pivot 27, to the gusset 6 of lid 8. The other end of the lever 19 is articulated, by means of a pivot 28, to a gusset 29 which is fixedly connected to the lever 18 approximately at the middle portion of the lever 18 (FIGS. 10 and 11).

The opening of the collapsible camper tent is obtained by first opening lid 7 which pivots around pivot 3 (FIGS. 1 to 5). Responsive to the movement of lid 7, the sections *a* and *b* of the canvas unfold the ribs I and II which, in their turn, pivot around pivots 11 and 12 of gusset 5. At this moment, the rib II comes to temporarily abut at 31 (FIG. 5) against gusset 31 and passes into position II' and rib I passes into position I' (dotted lines in FIG. 4).

Figure 9:
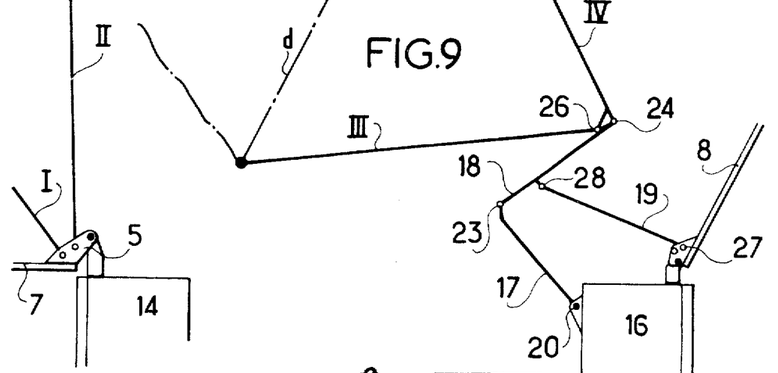
FIG. 9 shows the progression of the pivoting movement of the right side lid.

At a second stage, the pivoting of lid 8, around pivot 4 of gusset 6, displaces lever 19 and provides the stretching of the section *e* of the canvas (FIG. 7) which connects lid 8 to rib IV. Rib IV, in its turn, pivots around pivot 24 which connects rib IV to the end of lever 19. Lever 19, abutting against stop 30, provides the unfolding of levers 18 and 17 (FIG. 10). Rib IV, during its rotation around pivot 24 at the end of the lever 18, provides the rotation of rib III by means of the section *d* of the canvas which connects the two ribs III and IV together (FIG. 9).

Figure 11:
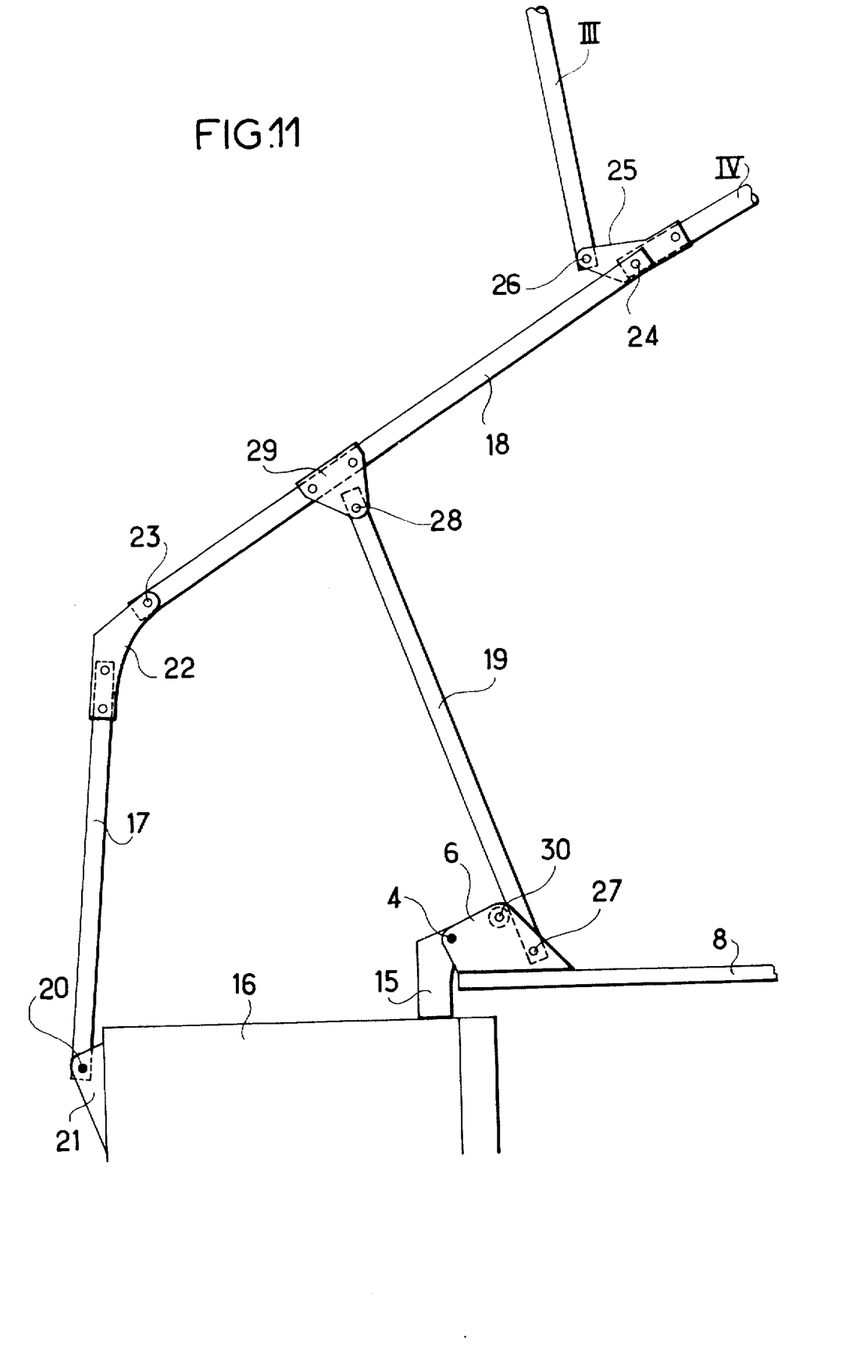
FIG. 11 shows, in an enlarged view, the detail of the right side lid in its opened position according to FIG. 1.

When lid 8 is completely opened to 180°, as shown in FIG. 11, the deformable parallelogram system formed by the lever arms 17, 18 and 19, the gussets 6, 22 and 29, the articulation points 4, 20, 23, 27 and 28 and the fixed gussets 15 and 21, provides the obtaining of a controlled ascending or descending trajectory curve of the articulation point 24 of rib IV to the end of the lever arm 18. This trajectory is necessary for permitting the erecting of the ribs III and IV (FIGS. 1 and 11) and their folding or collapsing (FIGS. 2 and 6) in such a way that ribs III and IV may be folded or fit under lid 8, in the transverse direction of body 1. It is thus seen that the present system permits the substantial increasing of the useful height of the camper tent at the side of ribs III and IV.

Figure 4:
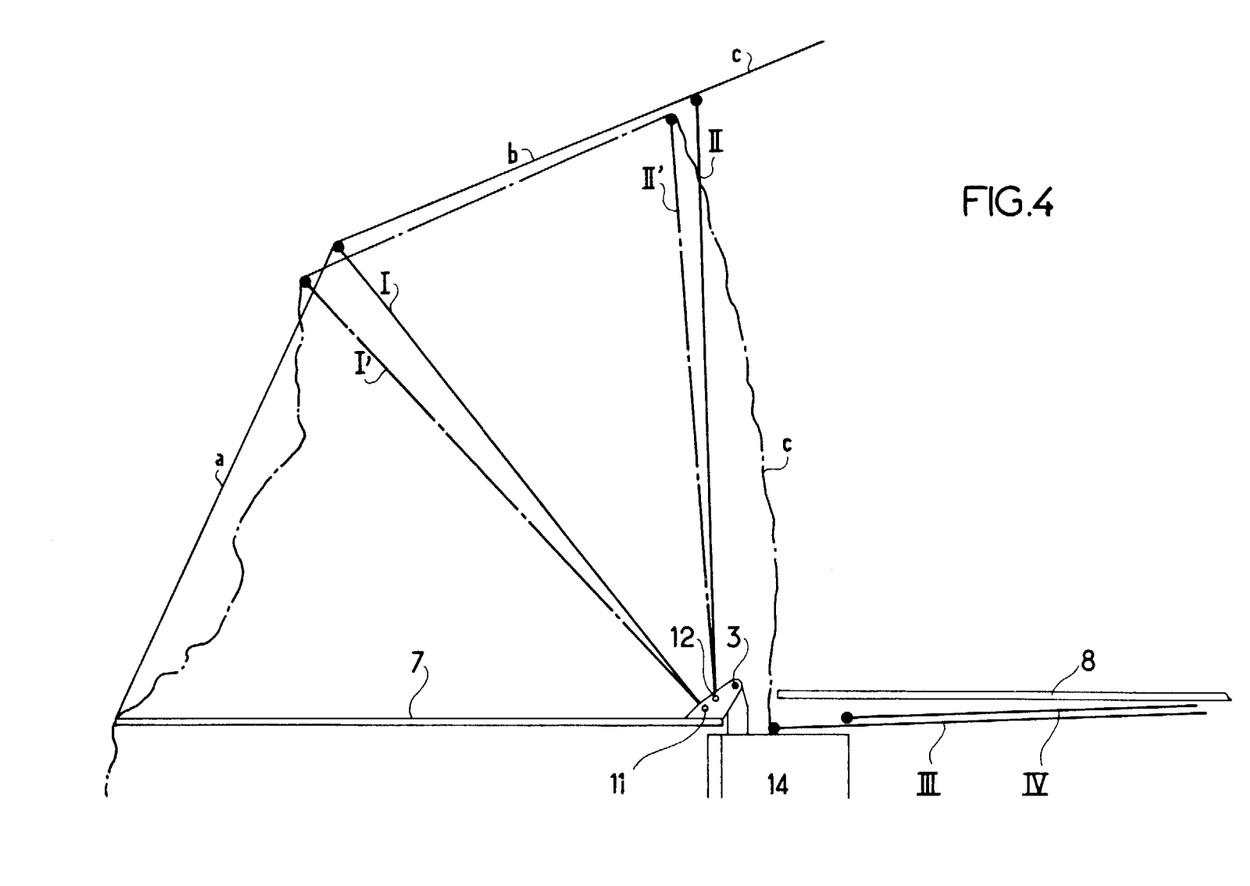
FIG. 4 shows the end of the opening operation of the left lid.
Figure 5:
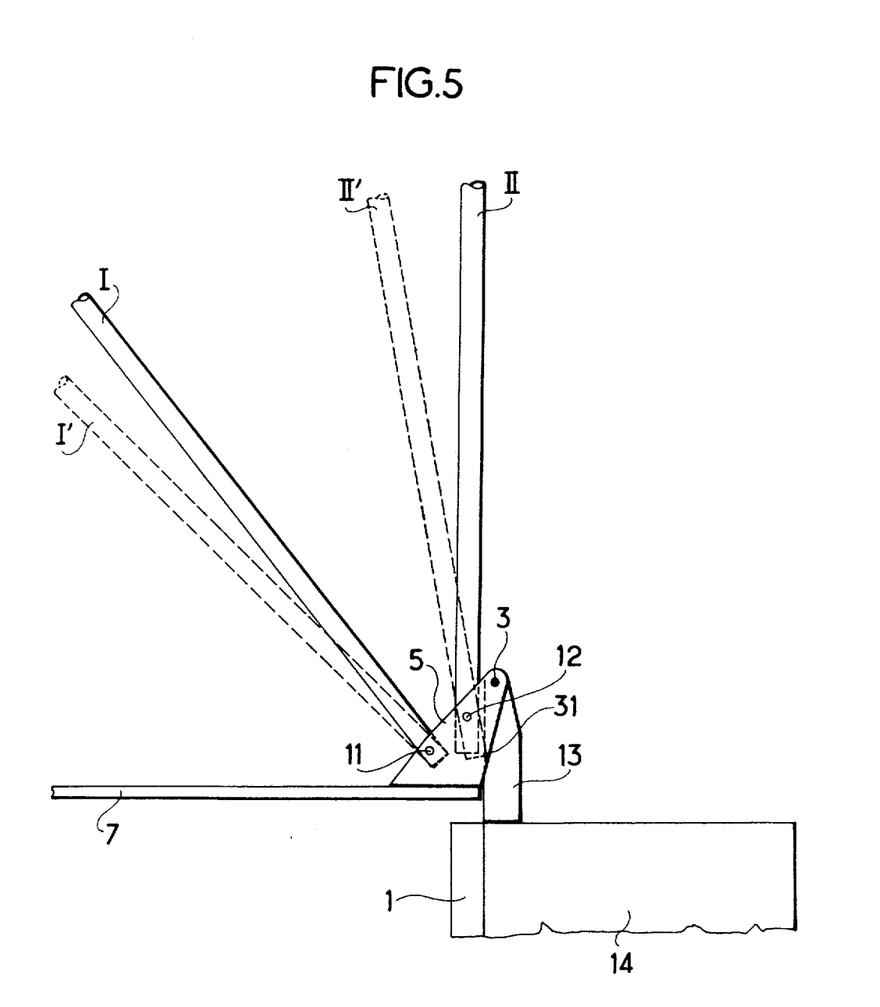
FIG. 5 shows, in an enlarged view, the detail of the left side lid in its opened position.
Figure 6:
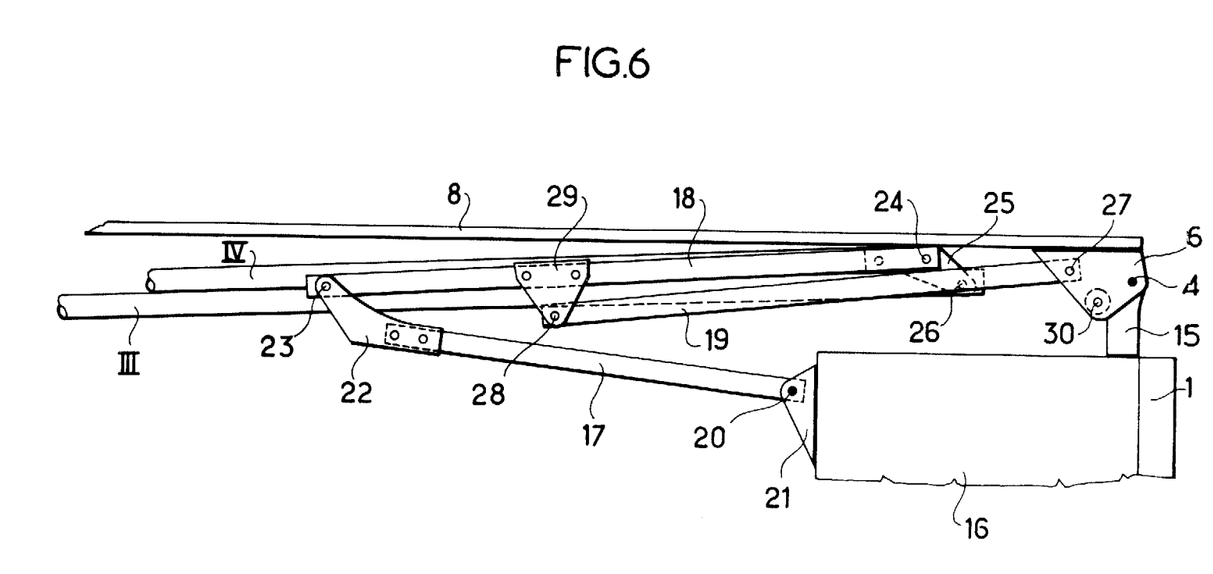
FIG. 6 shows, in an enlarged view, the detail of the right side lid in its closed position.
Figure 7:
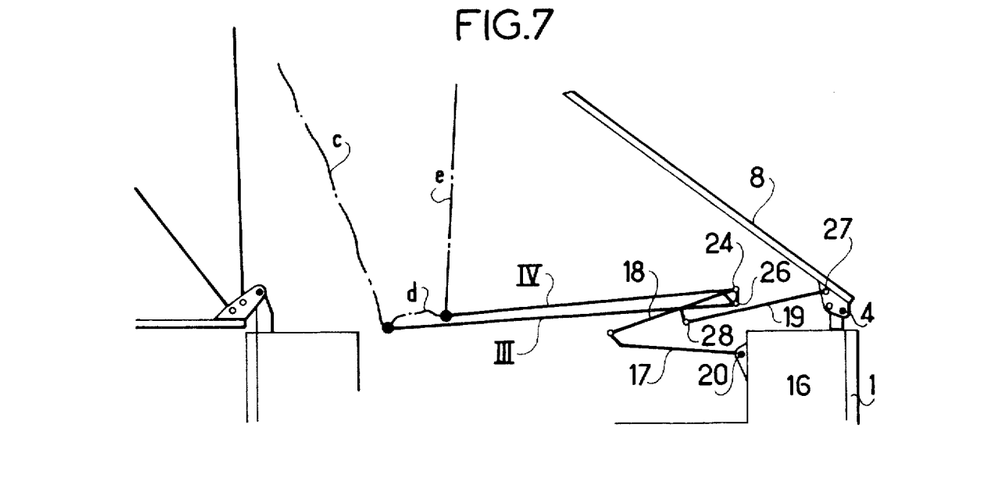
FIG. 7 shows the beginning of the pivoting of the right side lid.
Figure 8:
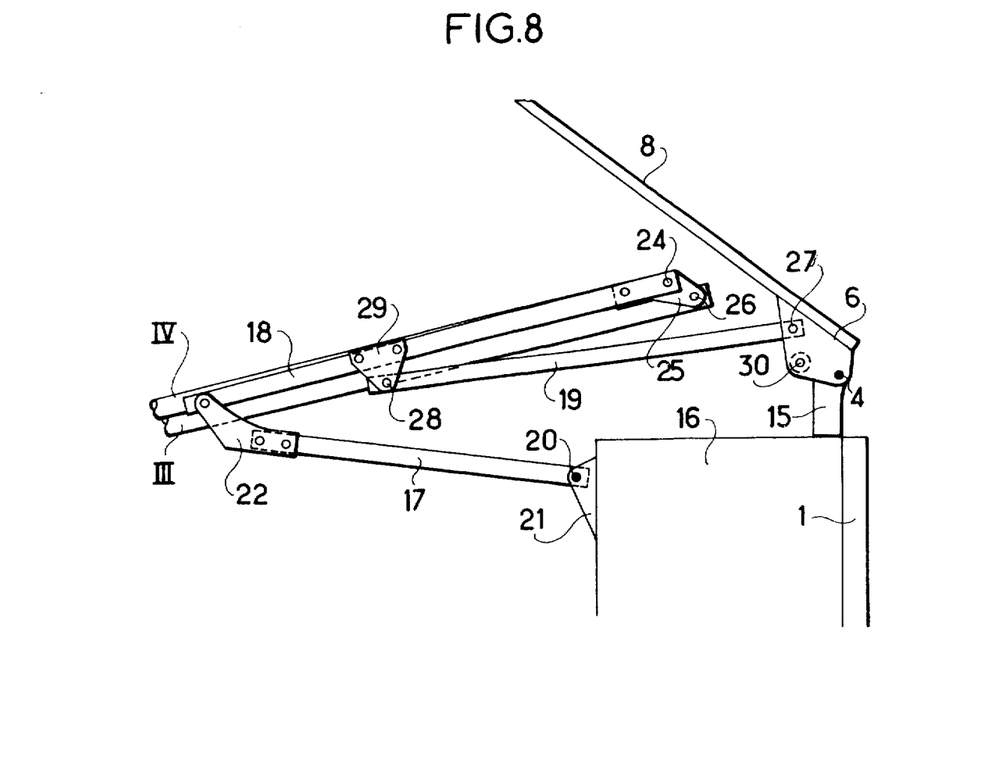
FIG. 8 shows, in an enlarged view, the detail of the articulation device shown in FIG. 7.

The opening is terminated when the section *c* of the canvas is stretched, and the ribs are brought from positions I' and II' to positions I and II (FIGS. 1 and 4).

All the lever arms, the gussets and their articulations as above described and shown in the figures are arranged in pairs, each lateral upright of each rib being provided with such elements.

I claim:

1. A collapsible camper tent having a frame equipped with wheels and a harness to be connected to a tractor vehicle, a body on said frame, having two pivoted lids and containing a canvas supported by a framework consisting of a plurality of U-shaped ribs pivotally supported by the body, the canvas being adapted to be stretched by the opening action of said two lids, said lids being pivoted at one of their edges to the body and being pivoted in the transverse direction of the camper tent, said collapsible camper tent being characterized in that:

two of said ribs of the framework which stretch the canvas are movably connected to the body by means of an articulated linkage system having a plurality of links, a first of said links being connected, to one of the pivoting lids of the body whereby the opening and the closing of the lid causes upward and downward movement of said two ribs to increase the effective length of the ribs when they are erected and shorten their effective length when they are collapsed, thus permitting their insertion under said lid in the direction of the width of the body;

said two ribs having free ends which are pivotably connected to one of the ends of a second link of said linkage system, the other end of said second link being pivotally connected to one end of a third link of said system, the other end of said third link being pivotally connected to a fixed point on the body, said first link of said system being pivotally connected to said lid and to said second link, and being pivoted to said lid by a gusset provided thereon.

2. Collapsible camper tent according to claim 1, wherein the two pivoting lids are articulated to the longitudinal sides of the body and overlap each other in their closed position.

3. Collapsible camper tent according to claim 1, wherein said three links forming said linkage system are pivotally connected to each other by means of gussets.

4. Collapsible camper tent accodding to claim 2, wherein two further ribs forming said framework have free 1, pivotally connected to gussets provided on the other of said pivoting lids, said gussets being articulated to fixed points on the longitudinal side of the body corresponding to said other pivoting lid.

5. Collapsible camper tent according to claim 1, wherein said ribs are four in number and are connected to each other by sections of the canvas that they support, the end canvas sections being connected to the free sides of the pivoting lids, respectively.

* * * * *